(12) United States Patent
Qian

(10) Patent No.: US 7,688,855 B2
(45) Date of Patent: Mar. 30, 2010

(54) MULTI-RATE MULTI-RECEIVER MULTI-RESPONSE AGGREGATION

(75) Inventor: Lu Qian, Solon, OH (US)

(73) Assignee: Cisco Technology, Inc., San Jose, CA (US)

( * ) Notice: Subject to any disclaimer, the term of this patent is extended or adjusted under 35 U.S.C. 154(b) by 1078 days.

(21) Appl. No.: 11/032,747

(22) Filed: Jan. 11, 2005

(65) Prior Publication Data
US 2005/0226222 A1 Oct. 13, 2005

Related U.S. Application Data

(63) Continuation-in-part of application No. 10/840,878, filed on May 7, 2004.

(60) Provisional application No. 60/616,306, filed on Oct. 6, 2004, provisional application No. 60/560,303, filed on Apr. 7, 2004.

(51) Int. Cl.
*H04J 3/16* (2006.01)
(52) U.S. Cl. .................. 370/469; 370/473; 714/750
(58) Field of Classification Search ............. 370/352, 370/469, 473; 714/750
See application file for complete search history.

(56) References Cited

U.S. PATENT DOCUMENTS

| | | | |
|---|---|---|---|
| 6,516,952 B1 * | 2/2003 | Wang et al. | 209/227 |
| 6,581,175 B1 * | 6/2003 | Crump et al. | 714/748 |
| 2003/0031145 A1 * | 2/2003 | Zeira et al. | 370/335 |
| 2003/0152058 A1 | 8/2003 | Cimini, Jr. et al. | |
| 2004/0054820 A1 | 3/2004 | Karaogus et al. | |
| 2004/0062273 A1 | 4/2004 | Frank et al. | |
| 2004/0093415 A1 * | 5/2004 | Thomas | 709/227 |
| 2004/0151206 A1 * | 8/2004 | Scholte | 370/473 |
| 2005/0135284 A1 * | 6/2005 | Nanda et al. | 370/294 |
| 2005/0165946 A1 * | 7/2005 | Stephens | 709/233 |

OTHER PUBLICATIONS

James Michael Wilson, www.wirelessdesignmag.com, "The Next Generation", Jan. 2005, pp. 16-18 and 20.
James M. Wilson, www.deviceforge.com/articles/AT5096801417.html, "Quadrupling Wi-Fi speeds with 802.11n", Aug. 9, 2004, pp. 1-9.
Syed Aon Mujtaba, TGn Sync Technical Proposal R00, "TGn Sync Proposal Technical Specification", Aug. 13, 2004, pp. 1-135.

* cited by examiner

*Primary Examiner*—Seema S Rao
*Assistant Examiner*—Sai-Ming Chan
(74) *Attorney, Agent, or Firm*—Tucker Ellis & West LLP

(57) ABSTRACT

A method for sending a multi-rate multi-receiver message containing a multi-receiver multi-response aggregate. The multi-rate multi-receiver aggregate is transmitted until a multi-receiver multi-response aggregate embedded within the multi-rate multi-receiver aggregate is encountered. Transmission of the multi-rate multi-receiver aggregate is suspended for a predetermined time period. After the expiration of the predetermined time period, transmission of the multi-rate multi-receiver aggregate resumes.

19 Claims, 4 Drawing Sheets

MULTI-RATE MULTI-RECEIVER MULTI-RESPONSE AGGREGATION

CROSS-REFERENCE TO RELATED APPLICATIONS

This application claims the benefit of priority of U.S. Provisional Application No. 60/616,306 filed Oct. 6, 2004, the contents of which are herby incorporated by reference. This application is a continuation-in-part of U.S. application Ser. No. 10/840,878, filed on May 7, 2004, which claims the benefit of priority of U.S. Provisional Application No. 60/560,303 filed Apr. 7, 2004, the contents of which are hereby incorporated by reference.

BACKGROUND OF THE INVENTION

The present invention relates generally to high throughput wireless networks and in particular to aggregation technology.

The next generation of high throughput (HT) wireless networks, to be covered by the 802.11n specification that is currently being formed, specifies 100 Mbps at the MAC SAP (Media Access Control Service Access Port) of an 802.11n device. Frame aggregation is a key technology employed to achieve such a high throughput.

One frame aggregation technique, MRMRA (multi-receiver multi-response aggregation), allows for frames for a number of receivers to be aggregated and allows for immediate responses from those multiple receivers as well, thus greatly increases the MAC efficiency, especially for QoS sensitive enterprise applications, such as wireless voice over IP (WVoIP). A benefit of MRMRA is that MRMRA not only allows for more than double the number of admissible phone calls, but also provides considerable amount of additional bandwidth for regular data traffic.

Another aggregation technique, MMRA (multi-rate multi-receiver aggregation), allows frames for multiple receivers of various rates and modulation schemes to be aggregated. MMRA consists of a bursting of a series of Physical Layer Service Data Units (PSDUs) possibly with various rates and modulation schemes. Each PSDU consists of a single frame or an aggregation of multiple frames either to the same receiver or to multiple receivers of the same rate. MMRA has the advantage of aggregating frames for receivers in a wide range of distances. However, MMRA's lack of support for immediate responses makes its use very limited, especially for latency sensitive applications such as WVoIP.

MMRA does not support multiple responses mainly for two reasons. First, an initiator for an MMRA does not know, in general, how long the bursting will last, so it lacks adequate information to schedule multiple responses. Second, the MMRA approach lacks a protection mechanism to protect the multi-responses from legacy nodes or hidden nodes. Moreover, scheduling multiple responses after the end of bursting is not favorable because it introduces excessive latency into the responses, which can be intolerable for latency sensitive applications, such as WVoIP in an enterprise environment, making QoS requirements hard to meet.

All terms and acronyms unless otherwise defined herein should if defined in the Institute of Electrical and Electronics Engineer's (IEEE) TGn Sync Proposal Technical Specification, TGn Sync Technical Proposal ROO (TGn Sync) dated Aug. 13, 2004, available at http://www.tgnsync.org/techdocs/tgnsync-proposal-technical-specification.pdf, be accorded the definition given in TGn Sync, otherwise they should be given their usual and customary definitions.

BRIEF SUMMARY OF THE INVENTION

In accordance with an aspect of the present invention, there is disclosed herein a new aggregation technology, the multi-rate multi-response, multi-receiver aggregation (MRMRMRA). MRMRMRA introduces two new operations for an MRA: suspension and resumption of MMRA bursting, along with the protection and scheduling aspects of MRMRA. In particular the following steps are taken for an MRMRMRA:

1) MRMRMRA bursting suspend temporarily after the transmission of an MRMRA aggregate;

2) The MRMRA comprises the channel reservation information for protection against legacy and hidden nodes and the multi-response scheduling information;

3) Multiple receivers of the MRMRA respond with ACKs (Acknowledgements) or Bas (Block Acknowledgements), possibly with bidirectional data attached, conforming to the response schedule of the MRMRA;

4) After the MRMRMRA initiator receives responses for the MRMRA, it sends a BA to the multiple receivers and finishes the MRMRA; and 5) The MRMRMRA bursting resumes and continues until the burst is complete or until another MRMRA aggregate is encountered.

The present invention comprises a methodology and system for implementing the MRMRMRA as described herein. MRMRMRA significantly enhances existing aggregation technology by broadening the scope of the applications of aggregation and benefiting from both MMRA and MRMRA. The present invention seamlessly combines MRMRA and MMRA without introducing any degradation in channel utilization. A feature of the present inventions is that the overhead to support the multi-response aspect of an MRMRMRA is very low. Moreover, the MRMRMRA minimizes latency, which is advantageous for latency sensitive applications, such as WVoIP, allowing them to meet their QoS requirements.

Still other objects of the present invention will become readily apparent to those skilled in this art from the following description wherein there is shown and described a preferred embodiment of this invention, simply by way of illustration of one of the best modes best suited for to carry out the invention. As it will be realized, the invention is capable of other different embodiments and its several details are capable of modifications in various obvious aspects all without departing from the invention. Accordingly, the drawing and descriptions will be regarded as illustrative in nature and not as restrictive.

BRIEF DESCRIPTION OF THE SEVERAL VIEWS OF THE DRAWING

The accompanying drawings incorporated in and forming a part of the specification, illustrate several aspects of the present invention, and together with the description serve to explain the principles of the invention.

DETAILED DESCRIPTION OF INVENTION

Throughout this description, the preferred embodiment and examples shown should be considered as exemplars, rather than limitations, of the present invention. The present invention is directed to a multi-rate aggregation scheme that is in the form of PSDU bursting, which aggregates multiple frames, either to the same receiver or a number of receivers of the same rate, in a single PSDU and bursts a number of PSDUs of various rates in sequence. To allow for a MRMRA, the PSDU bursting suspends temporarily after it transmits a MRMRA. After receiving acknowledgements from the recipients of the MRMRA, a block acknowledgement, is transmitted and the bursting resumes. This approach seamlessly combines MRMRA and multi-rate aggregation without introducing any degradation in channel utilization.

Figure 1:
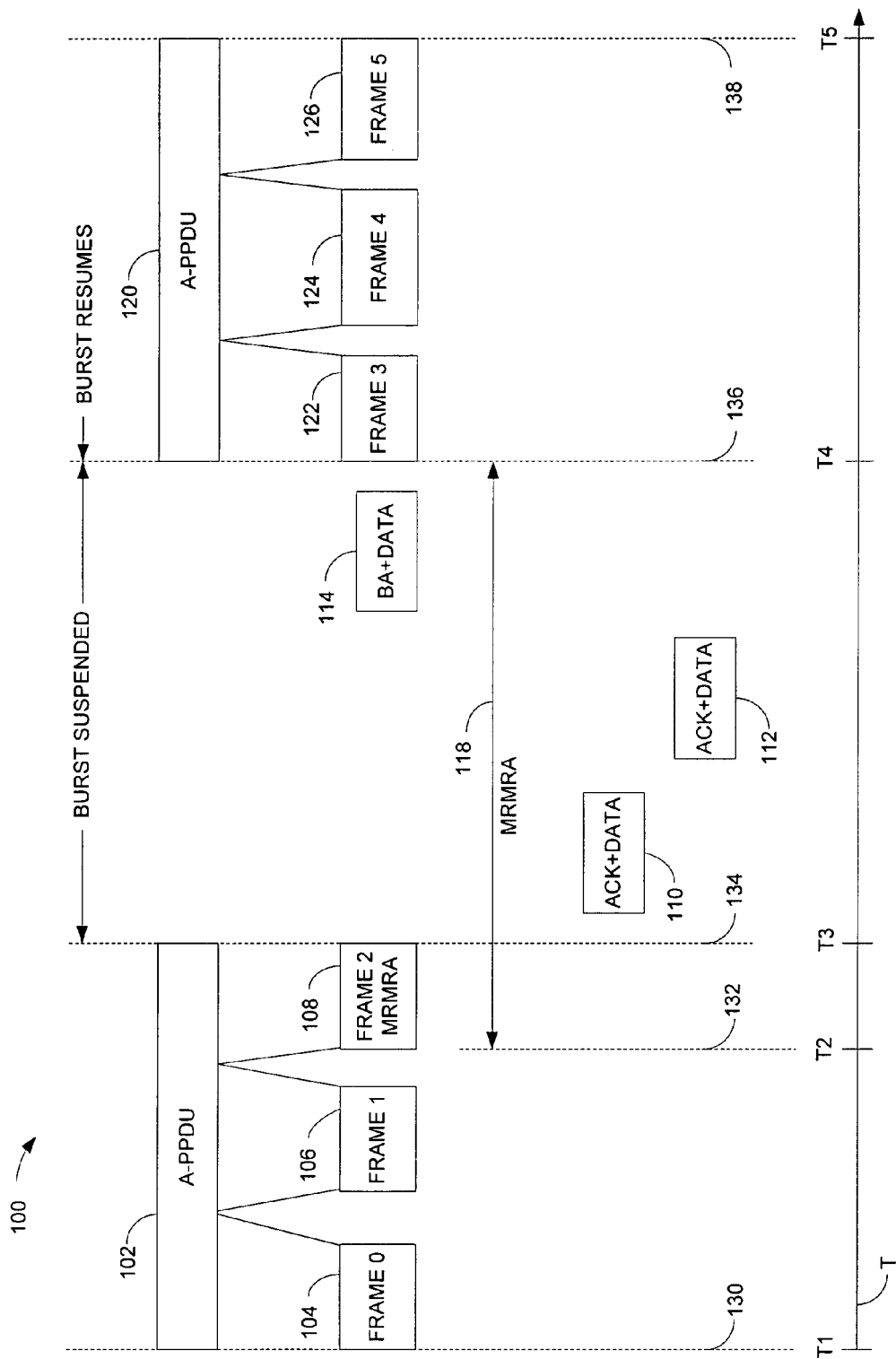
FIG. 1 is a timing diagram of an exemplary multi-rate aggregation scheme in accordance with an aspect of the present invention.

Referring to FIG. 1, there is illustrated an example timing diagram 100 illustrating an aspect of the present invention. A timeline T is employed for the purpose of illustrating the various timing sequences illustrated in timing diagram 100. At T1, illustrated by doted line 130, a burst is initiated that sends a portion 102 of a PPDU that comprises Frame 0 104, Frame 1 106 and Frame 2, 108, where frame 2 108 is a MRMRA frame. The burst continues, and at time T2, illustrated by dotted line 132, the MRMA Frame 108 is encountered. The burst is suspended after sending the MRMA Frame 108 at T3, illustrated by dotted line 134.

The burst is suspended until time T4, illustrated by dotted line 136. In a preferred embodiment the amount of time for suspending the burst is contained within the MRMRA frame 108. For example, MRMRA frame 108 contains a spoofed NAV field to prevent third parties from transmitting between times T3 and T4 which can also be used by the initiator to determine how long to suspend the burst transmission. While the burst is suspended, e.g., from T3 to T4, acknowledgements are received from receivers of the MRMRA frame 108. As shown in the example of FIG. 1, acknowledgements with data (ACK+Data 110 and ACK+Data 112) are received between T3 and T4. IT should be noted that Acknowledgements can be sent by themselves, or can include bidirectional data as shown in FIG. 1. The initiator of the burst sends a block acknowledgement with data (BA+Data) 114. Preferably, all of the receivers of the MRMRA have sent an ACK or an ACK+Data in response to the MRMRA frame 108. However, if one of the intended recipients of the MRMRA frame 108 does not respond to an MPDU, the initiator may retry transmitting the MPDU after sending the block acknowledgement 114, or alternatively, may include the MPDU in a future MRMRA, depending on the initiator's policy. Time line 118 illustrates the amount of time, T2 to T4, used for sending the MRMRA frame 108, receiving the acknowledgements 112 and 114, and the block acknowledgement 116.

At T4, the burst resumes, sending the remaining portion 120 of the PPDU. The burst comprising Frame 3 122, Frame 4 124 and Frame 5 126, and is completed, as shown at time T6. However, if another MRMRA frame (not shown) is encountered in the remaining portion of 120 of the PPDU, the burst is again suspended and the MRMRA is processed.

Extending MRMRA to multi-rate aggregation is a significant enhancement to aggregation mechanism, which greatly widens the application scopes of both MRMRA and multi-rate aggregation. It is especially beneficial in enterprise environment for applications such as wireless voice over IP.

One aspect of the present invention is that it allows for multiple responses, a desirable feature for many wireless applications. Another aspect of the present invention is that it allows for multi-rate aggregation, so that there are more frames to aggregate than single rate cases.

Figure 2:
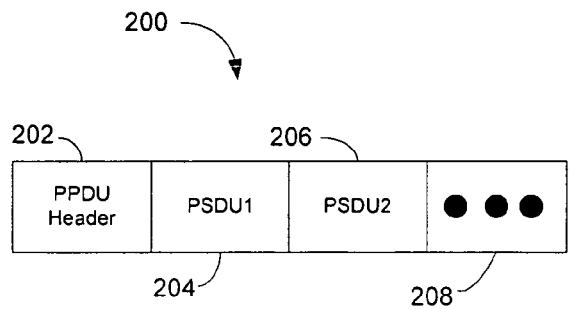
FIG. 2 is a block diagram of an aggregate data frame with multiple messages in accordance with an aspect of the present invention.

Referring now to FIG. 2, there is illustrated a block diagram of an aggregate data frame 200 with multiple messages in accordance with an aspect of the present invention. Data frame 200, as shown has a PPDU header (PLCP Header) 202, a first data unit (PSDU1) 204, a second data unit PSDU2) 206 and can have additional data units 208. PSDU1 204 comprises a first header and a first data segment. The first header has data fields for indicating the scheduled response time for acknowledging receipt of PDSU1 204. Likewise, PSDU2 206 has a second header and a second data segment, wherein the second header has data fields for indicating the scheduled response time for acknowledging receipt of PSDU2 206. Additional data units 208 can be appended to aggregate data frame 200 as desired. The additional data units 208 can have fields to indicate scheduled response times for corresponding data units. PLCP header 202 can have a field indicating the length of aggregate data frame 200. The value set in the field indicating the length of aggregate data frame 200 can be spoofed to include the length of time of aggregate data frame 200, the length of time allocated for a response to PSDU1 204, the time period allocated for a response to PSDU2 206, and the time period allocated for responding to any additional data units 208.

For example, if aggregate data frame 200 is a PPDU frame, a NAV in PCLP header 202 can be used to indicate the length of data frame 200. Each data unit, PSDU1 204, PSDU2 206 and any additional data units 208 can have a corresponding NAV and TXOP set to indicate the time to respond and the length of Is time allocated for their corresponding response. The NAV in PLCP header 202 would be set to include the length of aggregate data frame 110, the scheduled response period (TXOP) for PSDU1 204, scheduled response period (TXOP) for PSDU2 206 and any other additional data units 208. The NAV for the aggregate data frame can also include any SIF or other interframe time periods.

Figure 3:
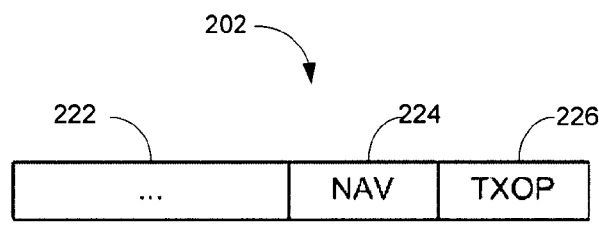
FIG. 3 is a block diagram of a PSDU frame header in accordance with an aspect of the present invention.

FIG. 3 is a block diagram of an exemplary PPDU header 202 in accordance with an aspect of the present invention. The frame header includes at least one header field 222, NAV 224 and TXOP 226. The at least one header field 222 can include any fields desired for the header of the associated PSDU frame, including but not limited to synchronization (SYNCH), source, destination, frame check sequence (e.g., CRC) or for any field defined in the 802.11 or appropriate specification for the frame. NAV 224 indicates to the recipient when to send an acknowledgement to the PSDU frame. TXOP 226 field indicates the amount of time allocated for the acknowledgement for the PSDU frame. Frame headers similarly configured like frame header 202 can be employed by the PSDU's within the MRMRA, for example PSDU1 204, PSDU2 206 and additional data units 208 (FIG. 2). When a receiver that is not a recipient of the MRMRA receives the MRMRA, it sets its NAV corresponding to the NAV in the PPDU header 202. If the receiver is a receiver of the MRMRA, then it sets its NAV according to the NAV in the corresponding PSDU.

Figure 4:
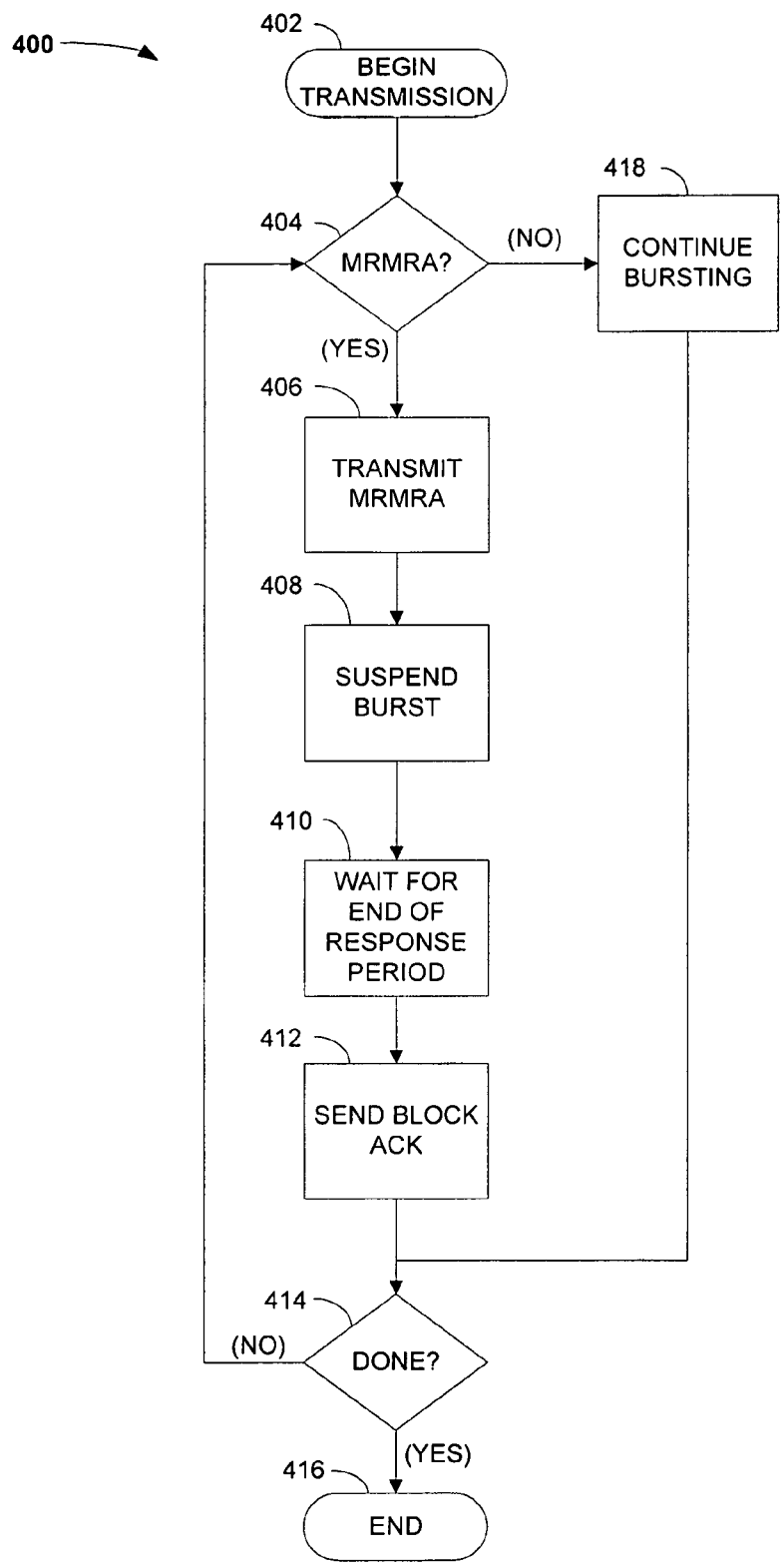
FIG. 4 is a block diagram of a methodology in accordance with an aspect of the present invention.

In view of the foregoing structural and functional features described above, a methodology in accordance with various aspects of the present invention will be better appreciated with reference to FIG. 4. While, for purposes of simplicity of explanation, the methodology of FIG. 4, is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention. Embodiments of the present invention are suitably adapted to implement the methodology in hardware, software, or a combination thereof.

Referring to FIG. 4, there is illustrated a block diagram of a methodology 400 in accordance with an aspect of the present invention. At 402 a burst transmission is initiated. Frames of the burst transmission are examined at 404, where it is determined whether a multi-receiver multi-response (MRMRA) frame is encountered.

If at 404 it is determined an MRMRA frame is being processed (YES) at 406 the MRMRA frame is transmitted. At 408 the burst is suspended. The initiator of the burst then waits for the end of the response period as shown at 410. In a preferred embodiment, the length of time for the initiator to wait is included in the MRMRA. For example, for an 802.11 implementation, a spoofed NAV in the header of the MRMRA is used to determine how long to wait. The NAV for the MRMRA can also include any SIF or other interframe time periods. During the response period, recipients of the MRMRA packet respond with an acknowledgement (ACK) or with an acknowledgement that includes data for the initiator (ACK+Data).

At 412 the initiator sends a block acknowledgement (Block ACK). Optionally, the block acknowledgement may include bidirectional data. The block acknowledgement is sent to the recipients of the MRMRA. Preferably, all of the receivers of the MRMRA have sent an ACK or an ACK+Data in response to the MRMRA. However, if one of the intended recipients of the MRMRA does not respond to an MPDU, the initiator may retry transmitting the MPDU after sending the block acknowledgement at 412, or alternatively, may include the MPDU in a future MRMRA, depending on the initiator's policy.

At 414, it is determined whether the burst is finished. If the burst is finished (YES), then the initiator stops transmitting at 416. If the burst is not finished (NO), then the methodology 400 returns to 404 where the next frame is evaluated.

If at 404 it is determined that the frame being transmitted is not an MRMRA (NO), then at 418 bursting continues and the next frame is transmitted. At 414, it is determined whether the burst is finished. If the burst is finished (YES), then the initiator stops transmitting at 416. If the burst is not finished (NO), then the methodology 400 returns to 404 where the next frame is evaluated.

It should be noted that if at 414 it is determined that the burst is not completed, processing returns to 404 for the next frame. If the next frame is an MRMRA, then the burst is again suspended and 406, 408, 410 and 412 are repeated. If the next frame is not an MRMRA, then as shown at 418 the burst continues. The burst may be suspended as many times as necessary for processing MRMRA frames.

Figure 5:
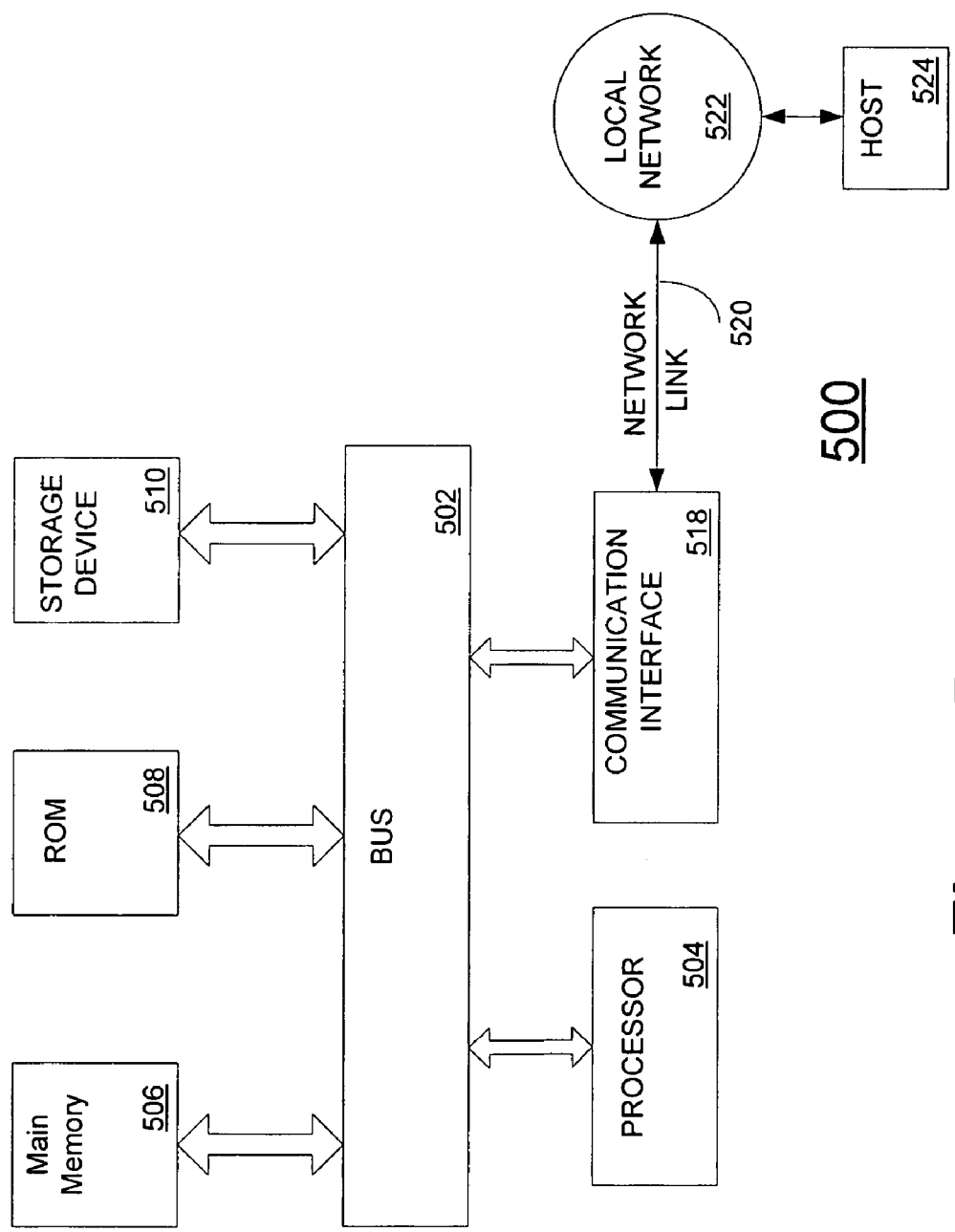
FIG. 5 is a block diagram of a computer system for implementing an aspect of the present invention.

FIG. 5 is a block diagram that illustrates a computer system 500 upon which an embodiment of the invention may be implemented. Computer system 500 includes a bus 502 or other communication mechanism for communicating information and a processor 504 coupled with bus 502 for processing information. Computer system 500 also includes a main memory 506, such as random access memory (RAM) or other dynamic storage device coupled to bus 502 for storing information and instructions to be executed by processor 504. Main memory 506 also may be used for storing a temporary variable or other intermediate information during execution of instructions to be executed by processor 504. Computer system 500 further includes a ready only memory (ROM) 508 or other static storage device coupled to bus 502 for storing static information and instructions for processor 504. A storage device 510, such as a magnetic disk or optical disk, is provided and coupled to bus 502 for storing information and instructions.

An aspect of the present invention is related to the use of computer system 500 for Multi-Rate Multi-Receiver Multi-Response Aggregation (MRMRMRA). According to one embodiment of the invention, MRMRA is provided by computer system 500 in response to processor 504 executing one or more sequences of one or more instructions contained in main memory 506. Such instructions may be read into main memory 506 from another computer-readable medium, such as storage device 510. Execution of the sequence of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to non-volatile media, and volatile media Non-volatile media include for example optical or magnetic disks, such as storage device 510. Volatile media include dynamic memory such as main memory 506. Common forms of computer-readable media include for example floppy disk, a flexible disk, hard disk, magnetic cards, paper tape, any other physical medium with patterns of holes, a RAM, a PROM, an EPROM, a FLASHPROM, any other memory chip or cartridge, or any other medium from which a computer can read.

Optionally, computer system 500 includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic, or optical signals that carry digital data streams representing various types of information. networks to other data devices. For example, network link 520 may provide a connection through local network 522 to a host computer 524. Local network 122 uses electrical, electromagnetic, and/or optical signals that carry the digital data to and from computer system 500, are exemplary forms of carrier waves transporting the information.

Computer system 500 can send messages and receive data, including program codes, through the network(s), network link 520, and communication interface 518. For example, host 524 might transmit a requested code for an application program through local network 522, and communication interface 518. In accordance with the invention, one such downloaded application provides for implementing MRMRMRA as described herein.

Figure 6:
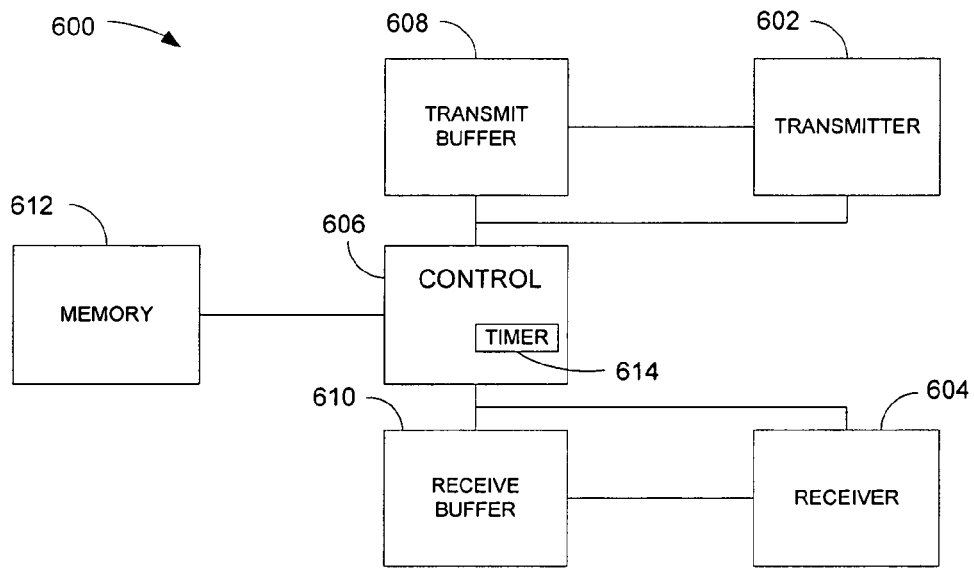
FIG. 6 is a block diagram of a system for implementing an aspect of the present invention.

FIG. 6 is a block diagram of a system 600 configured to operate in accordance with an aspect of the present invention. System 600 includes a transmitter 602 and a receiver 604. A controller (Control) 606, for example a computer system 500 (FIG. 5), is suitably adapted for controlling the transmitter 602 and receiver 604. Controller 606 suitably includes program code, or logic for performing control functions. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software. A transmit buffer 608 is used for buffering frames for transmission by transmitter 608. Controller 606 may suitably be connected to both transmit buffer 608 and transmitter 602 to monitor frames being transmitted or waiting to be transmitted by transmitter 602. Receiver 604 receives frames and stores them in receive buffer 610. Memory 612 is coupled to controller 606. Memory 612 is at least one of volatile or non-volatile memory and may be used by controller 606 for storing variables or other data used by controller 606 for controlling transmitter 602 and receiver 604. In addition, controller 606 can be configured for transferring data between memory 606 and transmit buffer 608 and/or memory 606 and receive buffer 610.

In operation, controller 606 puts frames into transmit buffer 608 for transmitting. Transmitter 602 initiates a burst transmission. When a MRMRA frame is detected, then controller 606 signals transmitter 602 to suspend transmitting the burst. In one embodiment, controller 606 may determine when an MRMRA is about to be transmitted by monitoring transmit buffer 608. In another embodiment, transmitter 602 signals controller 606 when it encounters an MRMRA frame. Controller 606 determines from the MRMRA frame the amount of time allocated for the MRMRA to receive responses, such as ACKs or ACKs+data and sets timer 614 accordingly.

While the burst transmission is suspended, receiver 604 receives responses to the MRMRA. The responses are forwarded to receive buffer 610. Optionally, controller 606 can examine the packets in receive buffer 610 to determine which receivers responded to the MRMRA and use memory 612 to track which receivers responded.

When timer 614 expires, controller 606 sends a block acknowledgement (BA) or a block acknowledgement with data (BA+data). Preferably, all receivers of the MRMRA responded and the BA or BA+data is directed to all recipients of the MRMRA. However, as those skilled in the art can readily appreciate, there may be circumstances where a receiver does not acknowledge the MRMRA, for example the receiver doesn't receive the MRMRA, or the corresponding MPDU within the MRMRA, and therefore doesn't respond. How the controller 606 handles a missing ACK can vary. For example, in one embodiment controller 606 resends the MPDU via transmitter 602 immediately after sending the BA. In another embodiment, controller 606 resends the MRMRA in a future packet. In still another embodiment, if the time period for delivering the MPDU expired, the MPDU is discarded.

In view of the foregoing, those skilled in the art can readily appreciate that the present invention extends the use of MRMRA to multi-rate aggregation. Furthermore, the present invention substantially enhances MMRA by allowing multiple immediate responses, a desirable feature for many wireless applications, such as QoS sensitive applications like WVoIP for example. The present invention provides higher MAC efficiency and much wider application scope than either MMRA or MRMRA by themselves while adding very little overhead and very little additional implementation cost for MMRA.

What has been described above includes exemplary implementations of the present invention. It is, of course, not possible to describe every conceivable combination of components or methodologies for purposes of describing the present is invention, but one of ordinary skill in the art will recognize that many further combinations and permutations of the present invention are possible. Accordingly, the present invention is intended to embrace all such alterations, modifications and variations that fall within the spirit and scope of the appended claims interpreted in accordance with the breadth to which they are fairly, legally and equitably entitled.

The invention claimed is:

1. A computer implemented method for sending a multi-rate multi-response multi-receiver aggregate frame comprising at least one data frame and at least one multi-receiver multi-response aggregate frame, the method comprising:
   initiating transmission of the multi-rate multi-response multi-receiver aggregate frame;
   transmitting at least one data frame embedded in the multi-rate, multi-response, multi-receiver aggregate frame until encountering a multi-receiver multi-response aggregate frame;
   transmitting the multi-receiver multi-response aggregate frame embedded within the multi-rate multi-receiver multi-response aggregate frame;
   suspending the transmission of the multi-rate multi-response multi-receiver aggregate frame, responsive to transmitting the multi-receiver multi-response aggregate frame, immediately after sending the multi-receiver multi-response aggregate frame embedded within the multi-rate multi-response multi-receiver aggregate before sending a next frame contained within the multi-rate multi-response multi-receiver aggregate frame;
   waiting for a predetermined time period after suspending the transmission; and
   resuming transmission of the multi-rate multi-response multi-receiver aggregate frame after waiting the predetermined time period;
   wherein resuming transmission comprises sending the next frame contained within the multi-rate, multi-response, multi-receiver aggregate frame.

2. A method according to claim 1, wherein the predetermined time period is defined by the multi-receiver multi-response aggregate frame.

3. A method according to claim 1, wherein the predetermined time period is based on a spoofed network allocation vector defined in the header of the multi-receiver multi-response aggregate frame.

4. A method according to claim 1, wherein the waiting for a predetermined time period further comprises waiting for acknowledgements from receivers of the multi-receiver multi-response aggregate frame.

5. A method according to claim 1, further comprising sending a block acknowledgement to the receivers of the multi-receiver multi-response aggregate frame during the predetermined time period.

6. A method according to claim 1, wherein the resuming continues until one of completion of transmitting the multi-rate multi-receiver aggregate frame and encountering another multi-receiver multi-response aggregate frame.

7. A method according to claim 1, further comprising:
resending a Media Access Control Protocol Data Unit to a receiver that did not respond to the multi-receiver multi-response aggregate frame immediately after sending a block acknowledgement to receivers that responded to the multi-receiver multi-response aggregate frame.

8. A method according to claim 1, further comprising:
embedding a Media Access Control Protocol Data Unit to a receiver that did not respond to the multi-receiver multi-response aggregate frame into a second multi-receiver multi-response aggregate frame to be sent after resuming transmission of the multi-rate multi-receiver aggregate frame.

9. A method according to claim 1, further comprising:
sending a block acknowledgement to the receivers of the multi-receiver multi-response aggregate frame during the predetermined time period;
wherein waiting for a predetermined time period further comprises waiting for acknowledgements from receivers of the multi-receiver multi-response aggregate frame;
wherein the time period is based on a spoofed network allocation vector defined in the header of the multi-receiver multi-response aggregate frame; and
wherein the resuming continues until one of completion of transmitting the multi-rate multi-receiver aggregate frame and encountering another multi-receiver multi-response aggregate frame.

10. A system for sending a multi-rate multi-response multi-receiver aggregate containing at least one data frame and at least one multi-receiver multi-response aggregate frame, comprising:
means for initiating transmission of the multi-rate multi-response multi-receiver aggregate frame;
means for transmitting at least one data frame embedded in the multi-rate, multi-response, multi-receiver aggregate frame until encountering a multi-receiver multi-response aggregate frame;
means for transmitting the multi-receiver multi-response aggregate frame embedded within the multi-rate multi-response multi-receiver aggregate frame;
means for suspending the transmission of the multi-rate multi-response multi-receiver aggregate frame, responsive to transmitting the multi-receiver multi-response aggregate frame, immediately after sending the multi-receiver multi-response aggregate frame embedded within the multi-rate multi-receiver aggregate frame before sending a next frame contained within the multi-rate multi-response multi-receiver aggregate frame;
means for waiting for a predetermined time period defined by the multi-receiver, multi- response aggregate frame after suspending transmission; and
means for resuming transmission of the multi-rate multi-response multi-receiver aggregate frame after waiting the predetermined time period.

11. A system according to claim 10, wherein the means for waiting for a predetermined time period is responsive to a spoofed network allocation vector defined in the header of the multi-receiver multi-response aggregate frame.

12. A system according to claim 10, further comprising means for receiving acknowledgements from receivers of the multi-receiver multi-response aggregate frame.

13. A system according to claim 10, farther comprising means for sending a block acknowledgement to the receivers of the multi-receiver multi-response aggregate frame during the predetermined time period.

14. A system according to claim 1, wherein the means for resuming transmission is responsive to continue transmitting the multi-rate multi-response multi-receiver aggregate frame until one of completion of transmitting the multi-rate multi-receiver aggregate frame and encountering another multi-receiver multi-response aggregate frame.

15. A computer-readable medium of instructions, comprising:
means for initiating transmission of a multi-rate multi-response multi-receiver aggregate frame;
means for transmitting at least one data frame embedded in the multi-rate, multi-response, multi-receiver aggregate frame until encountering a multi-receiver multi-response aggregate frame embedded within the multi-rate multi-response multi-receiver aggregate frame;
means for transmitting the multi-receiver multi-response aggregate frame embedded within the multi-rate multi-response multi-receiver aggregate frame;
means for suspending the transmission of the multi-rate multi-receiver aggregate frame, responsive to transmitting the multi-receiver multi-response aggregate frame, immediately after sending the multi-receiver multi-response aggregate frame embedded within the multi-rate multi-receiver aggregate frame before sending a next frame contained within the multi-rate multi-response multi-receiver aggregate frame;
means for waiting for a predetermined time period responsive to a spoofed network allocation vector defined in the header of the multi-receiver multi-response aggregate frame responsive to the means for suspending the transmission suspending transmission of the multi-rate multi-response multi-receiver aggregate frame; and
means for resuming transmission of the multi-rate multi-response multi-receiver aggregate frame after the means for waiting waits the predetermined time period.

16. A computer-readable medium of instructions as in claim 15, the means for waiting further comprises means for waiting for acknowledgements from receivers of the multi-receiver multi-response aggregate frame.

17. A computer-readable medium of instructions according to claim 16, further comprising means for sending a block acknowledgement to the receivers of the multi-receiver multi-response aggregate frame that responded with an acknowledgment.

18. A computer-readable medium of instructions according to claim 17, further comprising:
means for resending a Media Access Control Protocol Data Unit to a receiver that did not respond to the multi-receiver multi-response aggregate frame immediately after sending a block acknowledgement to receivers that responded to the multi-receiver multi-response aggregate frame.

19. A computer-readable medium of instructions according to claim 17, further comprising:
means for embedding a Media Access Control Protocol Data Unit to a receiver that did not respond to the multi-receiver multi-response aggregate frame into a second multi-receiver multi-response aggregate frame to be sent after resuming transmission of the multi-rate multi-receiver aggregate frame.

* * * * *